US006859022B2

(12) United States Patent
Oglesbee

(10) Patent No.: US 6,859,022 B2
(45) Date of Patent: Feb. 22, 2005

(54) TIMER CIRCUIT AND BATTERY PROTECTION CIRCUIT USING SAME

(75) Inventor: John Wendell Oglesbee, Watkinsville, GA (US)

(73) Assignee: Motorola, Inc., Schaumburg, IL (US)

( * ) Notice: Subject to any disclaimer, the term of this patent is extended or adjusted under 35 U.S.C. 154(b) by 204 days.

(21) Appl. No.: 10/260,380

(22) Filed: Sep. 28, 2002

(65) Prior Publication Data

US 2003/0155900 A1 Aug. 21, 2003

Related U.S. Application Data

(63) Continuation-in-part of application No. 10/077,355, filed on Feb. 15, 2002, now Pat. No. 6,667,606.
(60) Provisional application No. 60/357,172, filed on Feb. 15, 2002.

(51) Int. Cl.$^7$ ............................................... G05F 1/40
(52) U.S. Cl. ............................................................ 323/285
(58) Field of Search .................................. 323/223, 225, 323/273, 275–277, 282, 283, 285

(56) References Cited

U.S. PATENT DOCUMENTS

| | | | | |
|---|---|---|---|---|
| 5,675,240 A | * | 10/1997 | Fujisawa et al. | ............ 323/282 |
| 5,757,214 A | * | 5/1998 | Stoddard et al. | ............ 327/110 |
| 6,249,156 B1 | * | 6/2001 | Attwood | ...................... 327/110 |
| 6,313,616 B1 | * | 11/2001 | Deller et al. | ................ 323/282 |

* cited by examiner

Primary Examiner—Matthew V. Nguyen
(74) Attorney, Agent, or Firm—Philip H. Burrus, IV

(57) ABSTRACT

This invention includes an improvement to a power regulation and thermal management circuit. The power regulation and thermal management circuit includes a pass element coupled serially between a power source and a load. A voltage sensing circuit senses the voltage across the serial element and selects a corresponding current path based upon the sense voltage from a plurality of current paths. The invention includes a timing circuit that periodically, temporarily overrides the selection of current paths. The timing circuit generates a test pulse that temporarily turns all of the current paths on, thereby preventing a discharge lockout condition. The power regulation and thermal management circuit also includes a linear regulator to terminate charging at the appropriate voltage.

14 Claims, 3 Drawing Sheets

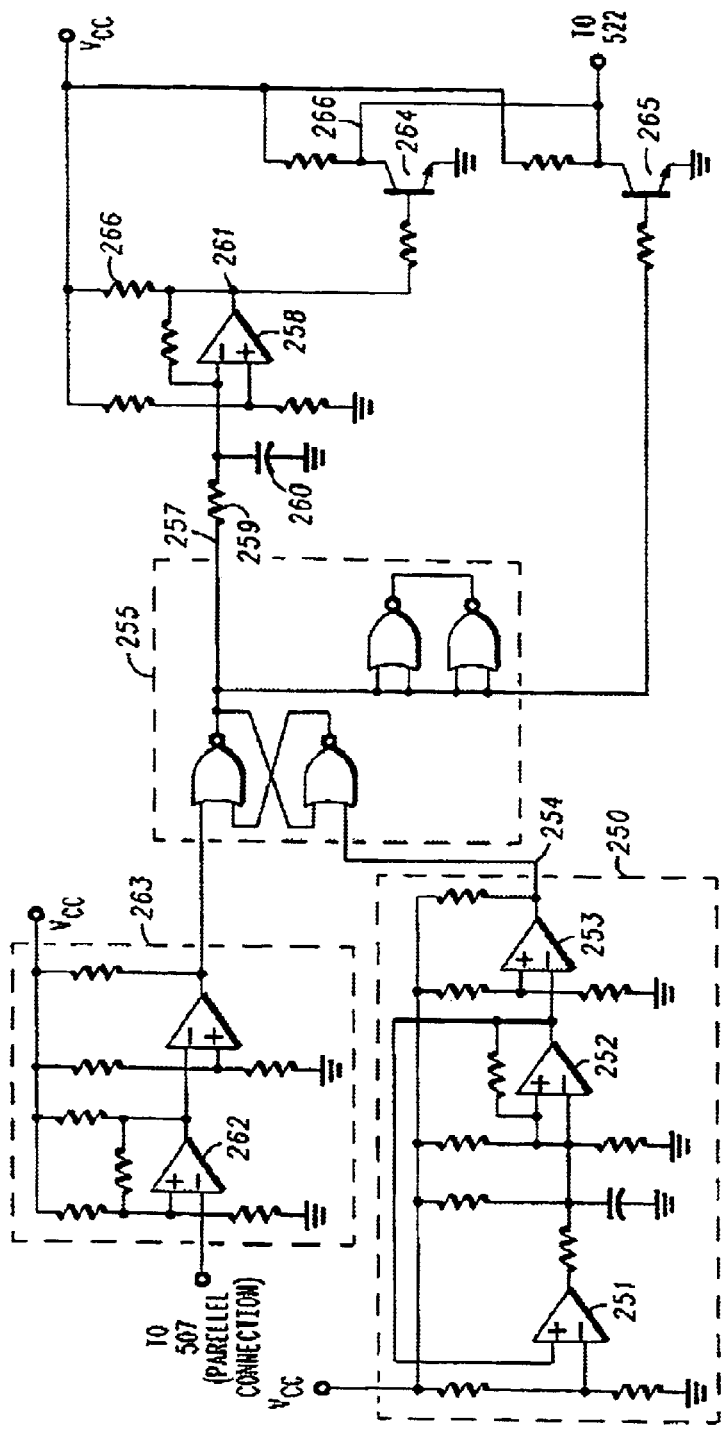

TIMER CIRCUIT AND BATTERY PROTECTION CIRCUIT USING SAME

CROSS-REFERENCE TO RELATED APPLICATIONS

This application is a continuation in part from U.S. application Ser. No. 10/077,355, filed Feb. 15, 2002 now U.S. Pat. No. 6,667,606, entitled "Power Regulation and Thermal Management Circuit and Method", the disclosures of which, including all attached documents and appendices, are incorporated by reference in their entirety for all purposes.

This application claims the benefit of priority from U.S. Provisional Application Ser. No. 60/357,172, filed Feb. 15, 2002, entitled "Battery Charging and Protection Circuit", the disclosures of which, including all attached documents and appendices, are incorporated by reference in their entirety for all purposes.

BACKGROUND

1. Technical Field

This invention relates generally to thermal regulation circuits for power dissipating electronic circuit elements, and more specifically to power regulation and thermal management for power transistors as, for example, in battery charging applications.

2. Background Art

FIG. 1 illustrates a simple battery charger 100 that is well known in the art. The charger 100 consists of a power supply 101, a linear regulator 102, a pass element 103 and a battery cell 104. The power supply 101 provides voltage and current to the battery cell 104. The voltage and current must be regulated by the pass element 103 so as to avoid charging the battery cell 104 too rapidly. The linear regulator 102 performs this regulation by dissipating as heat the difference between the power generated by the power supply 101 and the power stored by the battery cell 104.

The problem with this prior art solution is that the pass element 103 can overheat. This is best explained by way of example. For a typical single-cell, lithium battery application, a fully charged battery cell 104 typically registers about 4.1 volts. Thus, to fully charge the battery cell 104, and to give enough headroom for parasitic power losses in the pass element 103 and connecting circuitry, the power supply must be capable of supplying at least 5 volts. A typical battery cell 104 will charge optimally at a current of roughly 1 amp.

The problem arises with the battery cell 104 is fully discharged. A discharged battery cell 104 may register only 2 volts. As the power supply 101 would supply energy at a rate of 5 volts at 1 amp, or 5 watts, and the battery cell 104 stores energy at a rate of 2 volts at 1 amp, or 2 watts, the pass element 103 must dissipate energy at a rate of 3 watts. As typical pass elements 103 may come in a TO-220 package, 3 watts for extended periods of time may make the pass element 103 quite warm. Extended periods of heat may actually jeopardize reliability by approaching—or surpassing—the threshold junction temperature of the pass element 103.

The problem is exacerbated when an incompatible power supply 101 is coupled to the circuit. For example, if someone accidentally couples a 12-volt supply to the charger, the pass element 103 may have to dissipate 10 watts! This can eventually lead to thermal destruction of the pass element 103.

One solution to this problem is recited in U.S. Pat. No. 5,815,382, issued to Saint-Pierre et al. entitled "Tracking Circuit for Power Supply Output Control". This solution provides a means of reducing the output voltage of a power supply when the battery is in a discharged state, thereby reducing the total output power of the power supply. This, in turn, reduces the amount of power a pass element would need to dissipate.

While this is a very effective solution to the problem, it requires a power supply that both includes a feedback input and is responsive to the input by changing the output voltage. The electronics associated with an adjustable power supply can be more expensive that those found is a simple linear transformer power supply.

There is thus a need for an improved means of regulating temperature in a power-dissipating element like those employed as pass elements in battery charging applications.

BRIEF DESCRIPTION OF THE DRAWINGS

FIG. 1 is an illustration of a prior art charging circuit.

FIG. 2 is a timer circuit in accordance with the invention.

DETAILED DESCRIPTION OF THE INVENTION

Figure 3:
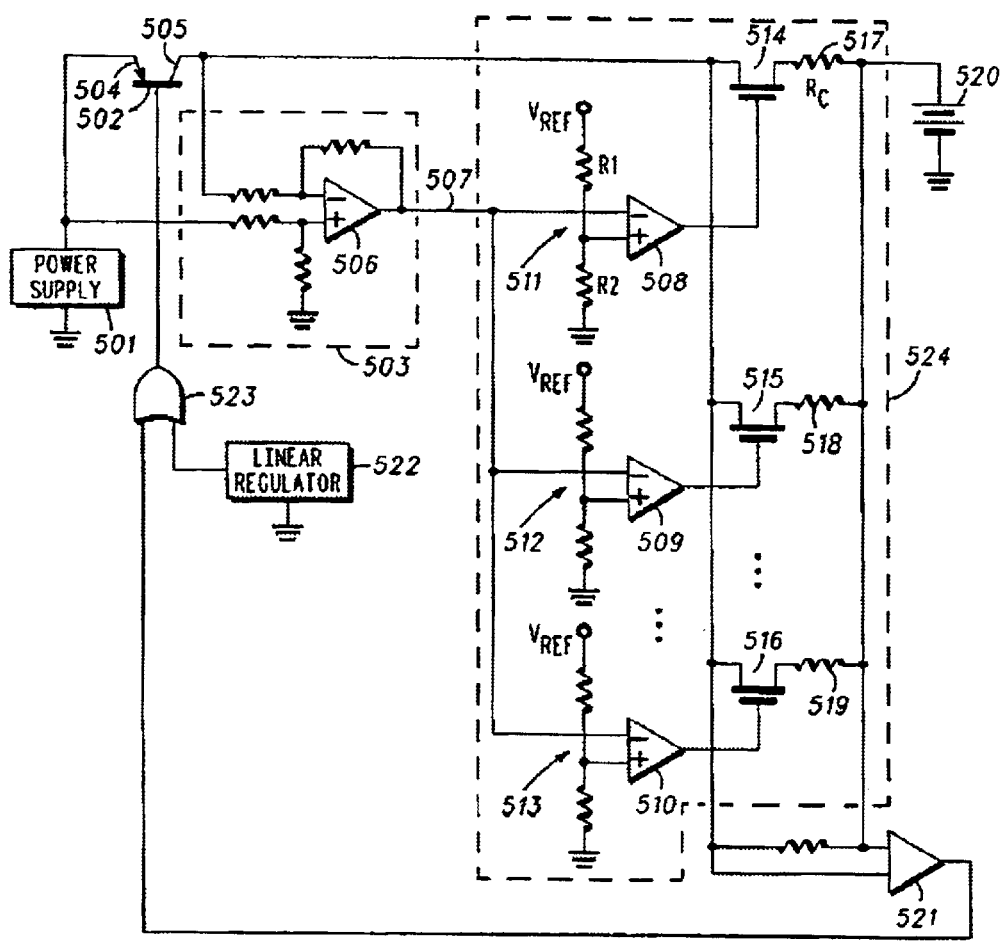
FIG. 3 is a schematic diagram in accordance with the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

The parent application, U.S. patent application Ser. No. 10/077,355, filed Feb. 15, 2002, incorporated herein by reference, teaches the power regulation and thermal management circuit shown in FIG. 3. The present invention offers an improvement to the circuit of FIG. 3.

Referring now to FIG. 3, a power supply 501 provides power to the circuit. The power supply 501 may be any of a number of power supply types, including but not limited to constant-current-constant-voltage (CCCV) and linear transformers. The power supply 501 is coupled to a pass element 502. In this preferred embodiment the pass element is a PNP bipolar junction transistor, although a large number of other types of pass elements may be substituted. The pass element 502 in this embodiment includes an emitter 504 and a collector 505.

A voltage sensing circuit 503 senses the voltage from collector 505 to emitter 504 (Vce). In one preferred embodiment, the voltage sensing circuit includes an op-amp 506 with a preset gain. The voltage sensing circuit 503 delivers a voltage output 507 that is proportional to Vce to a current switching network 524. The voltage output 507 is coupled to a plurality of comparators 508, 509, 510 in the current switching network 524, each comparator having a distinct reference voltage 511, 512, 513. The reference voltages 511, 512, 513 are easily set by resistor dividers. The number of comparators and corresponding reference voltages depends upon the resolution desired. It will be clear to those of ordinary skill in the art that the number of comparators may vary by application. It will also be obvious that the voltage references may be set in linear intervals, e.g. Vref, Vref*2, Vref*3, etc., as well as in non-linear intervals, e.g. Vref, Vref*a, Vref*b, etc.

A particular comparator will be selected based upon the level of the voltage sense output 507. Once actuated, the comparator will turn on a corresponding current switching transistor 514, 515, 516. The particular current switch transistor then couples the charging current through a current sensing resistor 517, 518, 519. The resultant current then flows through the cell 520.

The current is regulated by the current regulator 521, which in turn provides feedback to the pass element 502 to reduce or increase current accordingly. This is accomplished by comparing the voltage generated by current flowing through the current sensing resistors 517, 518, 519 to a reference by way of the current regulator 521. The values of the current sensing resistors 517, 518, 519, will of course have different values, each corresponding to a different level of current that should be allowed by the current regulator 521. The current regulator 521 then couples feedback to the pass element 502 to reduce current when the pass element 502 is in jeopardy of thermal breakdown. In this manner, the circuit facilitates charging at a constant power level (with respect to the pass element 502) by reducing current based upon the voltage across the pass element 502. The circuit is actuated in the danger zones, i.e. where Vce*Ichg is too large.

Note that the current regulator 521 is dominantly analog "OR" coupled with a conventional linear regulator 522. The OR connection 523 allows the current regulator to override the conventional linear regulator 522 when the pass element 502 is in a danger zone. At other, safe operating ranges, the pass element 502 is allowed to remain saturated to allow maximum charge current to flow in accordance with the conventional linear regulator 522.

The present invention offers an improvement to this circuit by adding a timer circuit to prevent discharge lockout. "Discharge lockout" is an issue that may arise with the circuit of FIG. 3 due to two distinct regions of charging power supply operation that trigger the power dissipation limits imposed by the current switching circuit 524 and the linear regulator 522. Discharge lockout is particularly prevalent an unregulated wall transformer power supply in which the output voltage tends to fall significantly as load current is increased and conversely tends to rise significantly as load current is decreased.

There are two predominant regions of unregulated wall transformer power supply operation: The first is a mode where the power supply output is low and Vce of the pass element 502 only a few tenths of a volt (i.e. "saturated"), and the charging current is relatively large. This will be referred to as the "low voltage high current region." The second is a mode that occurs at very low charging current when the power supply voltage is relatively high. This will be referred to as the "high voltage low current region."

For optimum charging performance it is preferable to stay in the low voltage high current region, as this region delivers the most efficient cell 520 charging. However, as the cell 520 termination voltage is reached, the linear regulator 522 finally begins reducing charging current requirements to maintain the appropriate charging termination voltage. This eventually begins turning off the pass element 502, which results in higher power dissipation in the pass element 502. As the power dissipation of the pass element 502 increases, the power management control of the current regulator 521 comes into play. The result is a further reduction in charging current such as to keep the power dissipation in the pass element 502 below the desired maximum value. These combined effects force the system to move very quickly from the low voltage high current region to the high voltage low current region. This is all very appropriate for top off charging of the cell 520 at a lower current rate.

If, however, the cell becomes loaded and therefore begins discharging, the current flowing in the pass element 502 cannot significantly increase again, as it would exceed the power dissipation criteria imposed by the current regulator 521 and the current switching network. The charging system in this state is prevented from moving from the high voltage low current region back to the low voltage high current region to more efficiently charge the now discharged cell 520. The charging system therefore becomes "stuck" in a relatively undesirable state, the discharge lockout state.

To manage and recover from this undesirable operation, the present invention adds a timer circuit to the circuit of FIG. 3. Referring now to FIG. 2, illustrated therein is one preferred embodiment of such a circuit. Operational amplifiers (op-amps) 251, 252, 253 form a free running timing oscillator 250 with an asymmetrical duty cycle. The timer output 254 at op-amp 253 is preferably high (upper power supply rail) for approximately 250 milliseconds, and low the remainder of the time. This pulse output repeats preferably every 30 seconds. This pulse will be hereinafter referred to as a "test pulse."

The test pulse sets a flip-flop 255 with a set dominate configuration. "Set dominate" means the test pulse input 254 dominates the flip-flop operation over the reset input 256. The flip-flop output 257 is forced low by the set input 254. This propagates through op-amp 258 (after a short delay provided by resistor 259 and capacitor 260) and causes the op-amp output 261 to go high. This signal then propagates to all gates within the current switching circuit (524 of FIG. 3).

Referring again to FIG. 3, during the test pulse interval, all transistors 514,515,516 of the current switching circuit 524 of FIG. 3 are turned "ON," regardless of the output logic states of the voltage comparators 508,509,510 used for detecting the Vce power management range. All resistors 517,518,519 of the current switching circuit 524 have voltages across them during the interval of the test pulse. This causes the previously regulated current to be maximized, as the total equivalent sense resistance (formed by the parallel resistors 517,518,519) is minimized by this forced override operation of the current switching circuit 524.

During the period of the test pulse therefore, the current switching circuit 524 is forced to its maximum current throughput, regardless of the power management criteria defined by the voltage comparators. Thus, during the test pulse, the power management of the pass element 502 is temporarily suspended. From a power dissipation standpoint, this is acceptable provided the pass element 502 can handle relatively high amounts of power for short periods of time. For properly sized power transistors commonly available on the market, this is generally the case. No damage will occur from this short interval of higher transient power, provided the time is limited to the duration of the test pulse.

Suspending power management temporarily (250 milliseconds every 30 seconds) affords an opportunity for the pass element 502 to turn "ON" completely, thereby becoming saturated. If the pass element 502 saturates during the test pulse and the power management suspension interval, the charging system will be able to move back to the low voltage high current region of operation. In general, once moving back to this preferred region, it will stay there if the cell is undercharged. The test pulse allows the charging system is move automatically and periodically back to the more desirable low voltage high current region of operation. This operation tends to be especially important when the cell is somewhat undercharged, and the linear regulator 522 is therefore not active during the interval of the test pulse.

Referring again to FIG. 2, another feature of the present invention is a voltage comparator 262 coupled in serially between the Vce detector (503 of FIG. 3) and the reset input 256 of the flip-flop 255. This is circuit is hereinafter referred to as the "desaturation detection" circuit 263. The Vce voltage (represented by node 507) arrives from the Vce detection circuit (503 of FIG. 3). If the Vce voltage is greater than a small value, for example 0.5 volts, the pass element (502 of FIG. 3) is said to be "de-saturated", meaning it is not operating in a saturated mode. If de-saturation is detected after the conclusion of the test pulse period, it will reset the flip-flop 255. When reset, the system cannot stay in the low voltage high current region, and must move back to the high voltage low current region. This is a safe condition for both the battery cell (520 of FIG. 3) and the pass element (502 of FIG. 3).

If, however, the pass element (502 of FIG. 3) stays saturated during the test pulse (and afterward), the flip-flop 255 is not reset, and the charging system then stays in the most desirable low voltage high current operating region.

An ancillary feature of the de-saturation detector 263 and test pulse methodology is that if the charging power supply is defective, or if the wrong charging power supply is used, the charging system is protected from the power supply delivering too much charging current. Referring again to FIG. 3, recall that during the test pulse interval power management is suspended. However, the current regulator 521 is still fully active to limit maximum current in the pass element 502. If a defective (or incorrect) charging power supply is used that does not have suitable current limiting characteristics, then the current regulator 521 will still limit the current the pass element 502 to a safe maximum. However, the pass element 502 cannot stay saturated if the current regulator 521 is actively limiting current. At the conclusion of the test pulse, the de-saturation detector (263 of FIG. 2) will detect that the pass element 502 is not saturated, and reset the flip-flop (255 of FIG. 2). The power management control system will then force the system back to the high voltage low current state. This logic sequence fully protects the charging system from power supplies that cannot adequately limit current.

Referring again to FIG. 2, the beginning edge of the test pulse is delayed by a time interval determined by capacitor 260 and resistor 259. The signal edge is effectively delayed in getting to op-amp 258 and the base of transistor 264. At the same time, an un-delayed version of the test pulse arrives at the base of transistor 265. When transistor 264 and transistor 265 are both simultaneously off, which only occurs during the beginning edge delay interval, current is allowed to flow from resistor 266 through to the linear regulator (522 of FIG. 3). This occurs only for a short time (a few milliseconds) at the beginning edge of each new test pulse. As a result, a pulse of current arrives at the linear regulator (522 of FIG. 3) at the beginning interval of each new test pulse.

Figure 4:
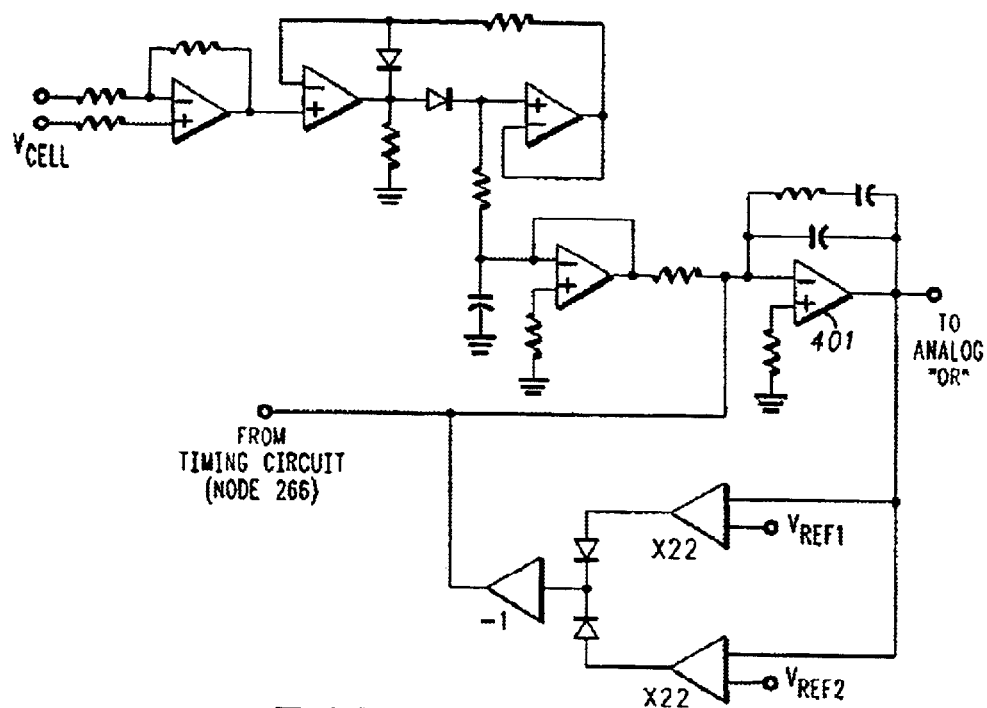
FIG. 4 is a schematic diagram of a preferred embodiment of a linear regulator in accordance with the invention.

The purpose of this current pulse, hereinafter referred to as a "reset pulse", is to reset the integrator (401 in FIG. 4) in the linear regulator (522 of FIG. 3) to a value that calls for zero current. The reset pulse forces the integrator (401 in FIG. 4) to integrate to its lowest output limit value (typically −100 millivolts) very quickly. This "integrator reset" operation precedes the beginning edge of the delayed test pulse arriving at the set input to the flip-flop 253. Thus, when the flip-flop 255 changes state, and forces the current switching circuit (524 of FIG. 3) to its minimum resistance value, the linear regulator (522 of FIG. 3) is already reset to a state calling for zero current from the current regulator (521 of FIG. 3). This is done to prevent any transient of current from occurring at the cell (520 of FIG. 3) resulting from switching the current switching circuit (524 of FIG. 3) from a value of low current to a value of higher current. In short, this feature prevents any transients resulting from the test pulse that might momentarily cause a voltage on the cell above its termination voltage value.

While the preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. For example, while the timing circuit is recited herein as an analog circuit comprising operational amplifiers, it could also be made using digital logic circuits or circuits employing oscillators or crystals.

What is claimed is:

1. A circuit for maintaining constant power dissipation in a series element, the circuit comprising:
 a. a power source input;
 b. a load output;
 c. at least one series element coupled serially between the power source input and the load output;
 d. a means of regulating current in the at least one series element; and
 e. a timing circuit for generating a periodic test pulse, wherein the timing pulse causes temporary override regulation of the means of regulating current in the at least one series element.

2. The circuit of claim 1 wherein the timing circuit comprises a delay circuit.

3. The circuit of claim 2, wherein the delay circuit comprises a resistor-capacitor filter.

4. The circuit of claim 2, wherein the timing circuit comprises a desaturation circuit.

5. The circuit of claim 4, wherein the desaturation circuit comprises at least one op-amp.

6. The circuit of claims 2 or 4, wherein the timing circuit further comprises:
 a. an oscillator having an asymmetric duty cycle; and
 b. a flip-flop coupled serially with the oscillator.

7. The circuit of claim 6, wherein the duty cycle is between 0 and 0.5.

8. The circuit of claim 1, wherein the means of regulating current comprises:
 a. a means for sensing a voltage across the series element;
 b. a parallel connection of a plurality of current sensing elements, the parallel connection being coupled serially between the power source input and the load output;
 c. a means of selecting at least one of the plurality of current sensing elements, wherein the selection corresponds to a voltage sensed by the means for sensing voltage across the series element.

9. The circuit of claim 8, further comprising a means for providing a feedback signal to the series element, the feedback signal corresponding to the selection of one of the plurality of current sensing elements.

10. The circuit of claim 9, wherein when the timing circuit temporarily overrides the means for regulating current, all of the plurality of current sensing elements are actuated.

11. The circuit of claim 10, wherein the means for sensing the voltage across the series element comprises an amplifier having an output signal, the output signal being of a voltage that is proportional to the voltage across the series element.

12. The circuit of claim 11, wherein the means of selecting one of the plurality of current sensing elements comprises a plurality of comparators coupled to the output signal, each comparator having a corresponding reference voltage, such that the comparator is selected when the output signal exceeds the corresponding reference voltage.

13. The circuit of claim 12, wherein the means of selecting one of the plurality of current sensing elements selects at least one current sensing element such that the feedback signal to the series element causes power dissipated in the series element to remain below a predetermined threshold.

14. The circuit of claim 12, further comprising a linear regulator coupled to in an analog OR configuration with the means of regulating current.

* * * * *

UNITED STATES PATENT AND TRADEMARK OFFICE
CERTIFICATE OF CORRECTION

PATENT NO. : 6,859,022 B2
DATED : February 22, 2005
INVENTOR(S) : Oglesbee

It is certified that error appears in the above-identified patent and that said Letters Patent is hereby corrected as shown below:

Column 6,
Line 37, the words "the timing pulse" should read -- the test pulse --.

Signed and Sealed this

Sixteenth Day of August, 2005

JON W. DUDAS
*Director of the United States Patent and Trademark Office*